United States Patent

Liberman et al.

[15] 3,655,915

[45] Apr. 11, 1972

[54] CLOSED LOOP TEST METHOD AND APPARATUS FOR DUPLEX DATA TRANSMISSION MODEM

[72] Inventors: Richard Allen Liberman, Stratford; Steven Jay Davis, Ridgefield, both of Conn.

[73] Assignee: General Datacomm Industries, Norwalk, Conn.

[22] Filed: May 7, 1970

[21] Appl. No.: 35,454

[52] U.S. Cl. ....................179/2 DP, 178/58, 179/15 BF, 179/175.1 R

[51] Int. Cl. ....................H04m 11/06

[58] Field of Search ..........178/58; 179/15 R, 15 FD, 2 DP, 179/15 BF, 175, 175.3, 175.1; 325/25; 340/146.1

[56] References Cited

UNITED STATES PATENTS 2,864,942 12/1958 Drake....................325/25
2,871,289 1/1959 Cox et al....................340/146.1 ER
3,049,692 8/1962 Hunt....................340/146.1

OTHER PUBLICATIONS

Bell System Data Communication Technical Reference Manual, " Data Set 103f Interface Specification," C American Telephone and Telegraph Co., 1964.

*Primary Examiner*—Kathleen H. Claffy
*Assistant Examiner*—David L. Stewart
*Attorney*—Pennie, Edmonds, Morton, Taylor and Adams

[57] ABSTRACT

A duplex data transmission modem is provided having facilities for transmitting data on either a call originate frequency F1 or a call answer frequency F2 while simultaneously receiving data on a call originate frequency F2 and a call answer frequency F1. Control apparatus is provided in the modem for closed loop testing wherein the modem receiver is forced to receive the normal outgoing data modulated carrier signal and return the data signal back to the incoming line and thereby provide loopback on the analog or tone side of the telephone line interface.

2 Claims, 3 Drawing Figures

INVENTORS
Richard A. Liberman
Steven J. Davis
BY Pennie, Edmonds
Morton, Taylor and Adams
ATTORNEYS INVENTORS
Richard A. Liberman
Steven J. Davis
BY Pennie, Edmonds, Morton, Taylor and Adams
ATTORNEYS INVENTORS
Richard A. Liberman
Steven J. Davis
BY Pennie, Edmonds, Morton, Taylor and Adams
ATTORNEYS

CLOSED LOOP TEST METHOD AND APPARATUS FOR DUPLEX DATA TRANSMISSION MODEM

BACKGROUND OF THE INVENTION

The present invention is related to data transmission systems and more specifically to duplex type modems which provide for simultaneous two-way transmission of data on a transmission circuit such as a two-wire telephone line. Such modems provide for modulation of a carrier by a stream of data bits received from a business or data-processing machine, transmission of the data modulated carrier over a conventional telephone circuit and recovery of the data bits at the receiving end by a carrier demodulator.

In modern time-share computer systems, data is commonly transmitted many hundreds of miles through a variety of signal amplifying, switching and processing equipment. Because of system complexity and high operating costs, it has become increasingly important for an operator to be able to check the operating integrity of the data transmission system and in the event of failure to be able to identify the point of breakdown as rapidly and precisely as possible. Since the signal translating modem is so commonly used at the terminal ends of most data transmission systems, it would be desirable to have control means available for closed loop testing of a major system including the data set modem. In the known prior art duplex modems, this test facility has not been available because the transmitter modulator and receiver demodulators are required to operate simultaneously at different frequencies on the same transmission facility.

SUMMARY OF THE INVENTION

In accordance with the present invention, control means are provided as part of a duplex data-set modem which permit the modem to operate in a loop configuration for testing purposes. In the test loop operation, data pulses from a business machine are transmitted through the transmitter, the output of which is directed back to the local receiver instead of the outgoing line. In test mode, the receiver is forced to operate at the same frequency as the transmitter so that the data signal is recovered by demodulation and returned to the business machine.

DESCRIPTION OF THE DRAWINGS

In the drawings:

FIG. 1 illustrates in simple block diagram form a typical data transmission system comprising a plurality of low speed data inputs and outputs 9A–N interconnected via TDM (time-division multiplexer) 10A, high speed transmission channel 11, TDM 10B and low speed data inputs and outputs 9A′–N′. For purposes of explaining the present invention, consideration should be directed to a single channel 9N supplied with data pulses 15 from teletype machine TT which are sequentially transmitted by 10A, 11, 10B and 9N′ to data modem 20 coupling transformer 21 and finally to local telephone line 25 as a modulated carrier signal 15M.

To facilitate the overall operational testing of transmission channel 9N, data modem 20 is provided with control apparatus which can be actuated as required to close the transmission loop (as shown symbolically by dotted arrow 30) and cause the carrier modulated signal 15M to be demodulated by the modem receiver and returned through the system to the teletype source TT for system evaluation.

Figure 2:
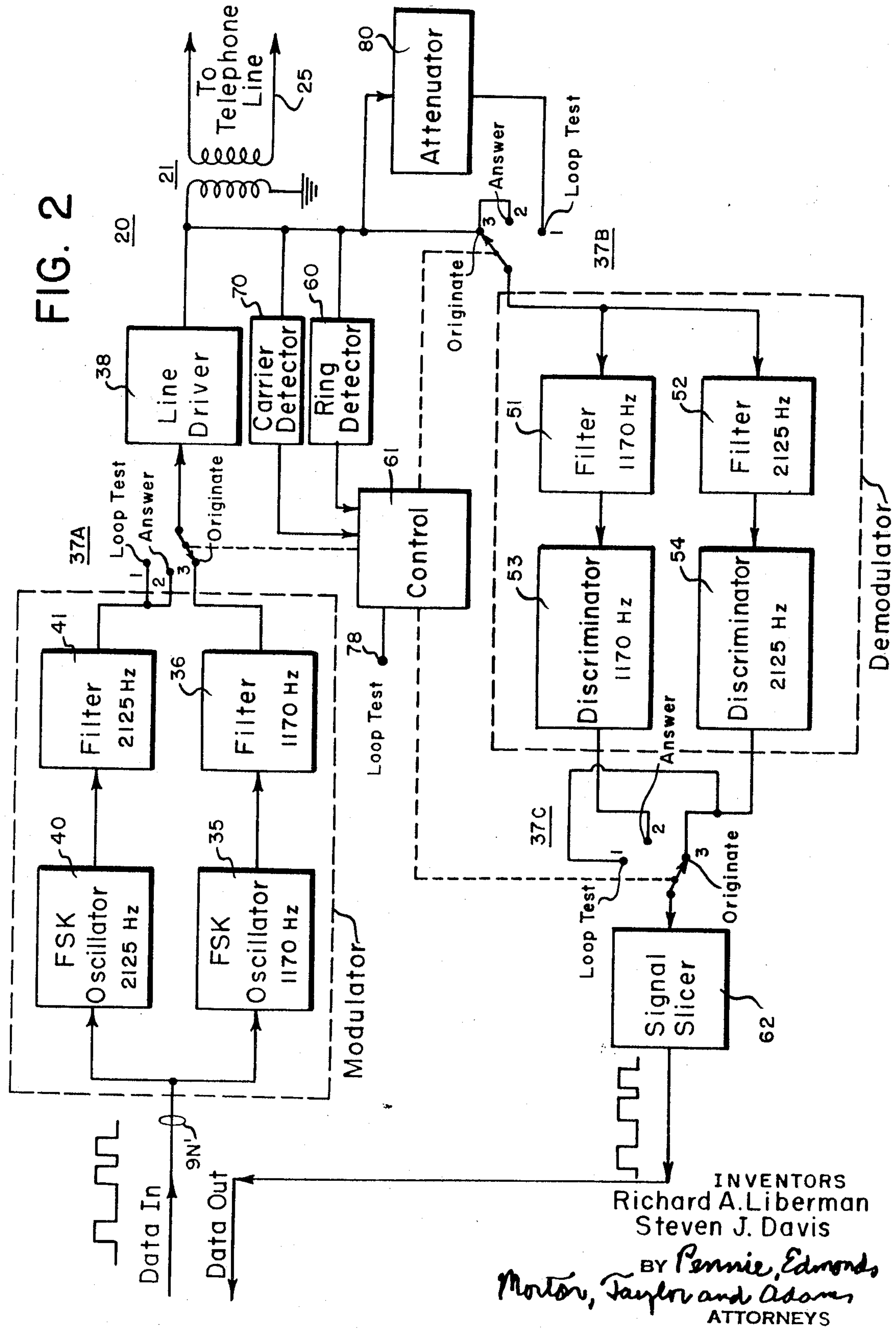
FIG. 2 is a simplified block diagram of a dual frequency modem showing control means of the present invention which provide closed loop testing of the transmission system.

The block diagram shown in FIG. 2 illustrates the operation of the present invention in conjunction with a typical modem such as the Data-Set 103A manufactured by the Bell Telephone System. Such data sets have two operating frequency modes, originate and answer. When the modem 20 is at the location that originates a call, the output of a frequency shift modulated 1170 Hz oscillator 35 passed through bandpass filter 36 is selected as shown by switch 37, amplified by line driver 38 and supplied to line 25 by coupling transformer 21. On the other hand, when the modem 20 is at a location that receives a call, the output of a frequency-shift modulated 2,125 Hz oscillator 40 passed through bandpass filter 41 is selected as shown by switch 37 and supplied to the output line 25 in the manner described above.

In the course of normal operation, the demodulator operates to receive signals on the alternate frequency not being used by the transmitter modulator section of the modem. Thus, incoming carrier modulated signals from line 25 are supplied through switch 37B and filters 51 and 52 to the 1,170 Hz discriminator 53 and the 2,125 Hz discriminator 54 as shown. Through the ganged operation of switches 37A and 37C, it can be seen that different operating frequencies are always chosen for the transmitter modulator and receiver demodulator to permit simultaneous two-way data transmission on the basis of frequency division and the choice is reversed with change between answer mode and originate mode.

In conventional operation, the modem is quiescently conditioned to operate in the call originate mode. Ring detector 60 is tripped when a ringing signal is received from a calling station and control 61 is energized causing switch 37A–C to be switched to the "answer" mode (position 1) where it remains for the duration of the call. Control 61 also energizes oscillator 40 which transmits a 2,125 Hz carrier that is sensed in the calling modem by a carrier detector 70 that energizes its 1,170 Hz oscillator. With the interconnected modems automatically set up for two-way duplex operation, input signals from a local or a remotely located data source are supplied on data input line 9N′ to the modulator as described above and transmitted on either of the two carrier frequencies via line 25 to the interconnected modem. Data signals received on either one of the two carrier frequencies are recovered by the appropriate discriminator (1,170 Hz or 2,125 Hz), processed by signal slicer 62 and supplied to data output line 9N′.

In accordance with a principal feature of the present invention, means are provided for controlling the simultaneous operations of the modulator and demodulator sections of the modem so that a business machine supplying data input pulses to line 9N′ can test the operating integrity of the complete modem 20 by forcing the input signals to be demodulated by the local demodulator and returned back to the machine source on line 9N′. Such a closed loop test is not available on known existing modems because of the fact that the modulator and demodulator operating frequencies are always different in order to maintain the facility of simultaneous two-way communication of data.

Figure 1:
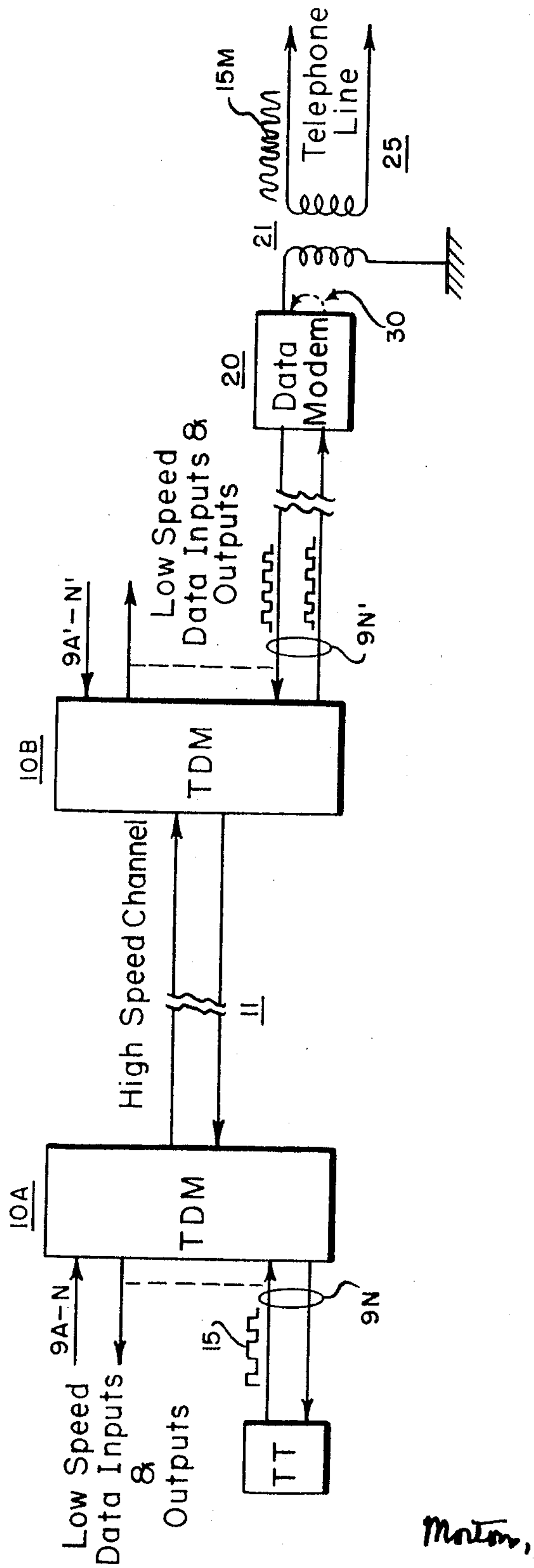
FIG. 1 is a simplified block diagram of a typical data transmission system in which the present invention is used.

The desired modem loop test is provided in accordance with the present invention by supplying a loop-test control signal via terminal 78 to control 61 which responds to position switch 37A–C to test position 1. In so doing, the modulator is in effect switched from the quiescent originate mode (1,170 Hz) to the answer mode (2,125 Hz) and the demodulator is in effect restrained to operate in the receive originate mode (2,125 Hz). In other words, the demodulator and modulator are switched to operate on the same frequency instead of different frequencies and at the same time the transmitted signal supplied to the receiver for loop test is dropped in level by attenuator 80 (about 30 db) which is switched into the receiver line by switch 37B as shown. Additionally, the modem control signals are functionally placed in the answer mode. This permits the transmitter to generate a tone to the receiver and primes the receiver to receive a tone. Upon reception of the tone, the carrier detector is turned on and the output becomes unclamped. The hand-shaking procedure in this test mode is the same as would occur in normal operation when receiving signals from a remote modem. It will be understood that the loop test control signal applied to 78 may be generated locally or it may have its origin in a remotely located city and be transmitted over the entire data transmission system to close the loop for test purposes as illustrated in FIG. 1. It can be appreciated by those skilled in the art that such a closed loop test is useful, not only to give assurance that the system as a whole (i.e., up to and through the modem) is operating properly prior to commencement of a transmission interval but also to provide a means to isolate the point after or before which there has been failure.

Figure 3:
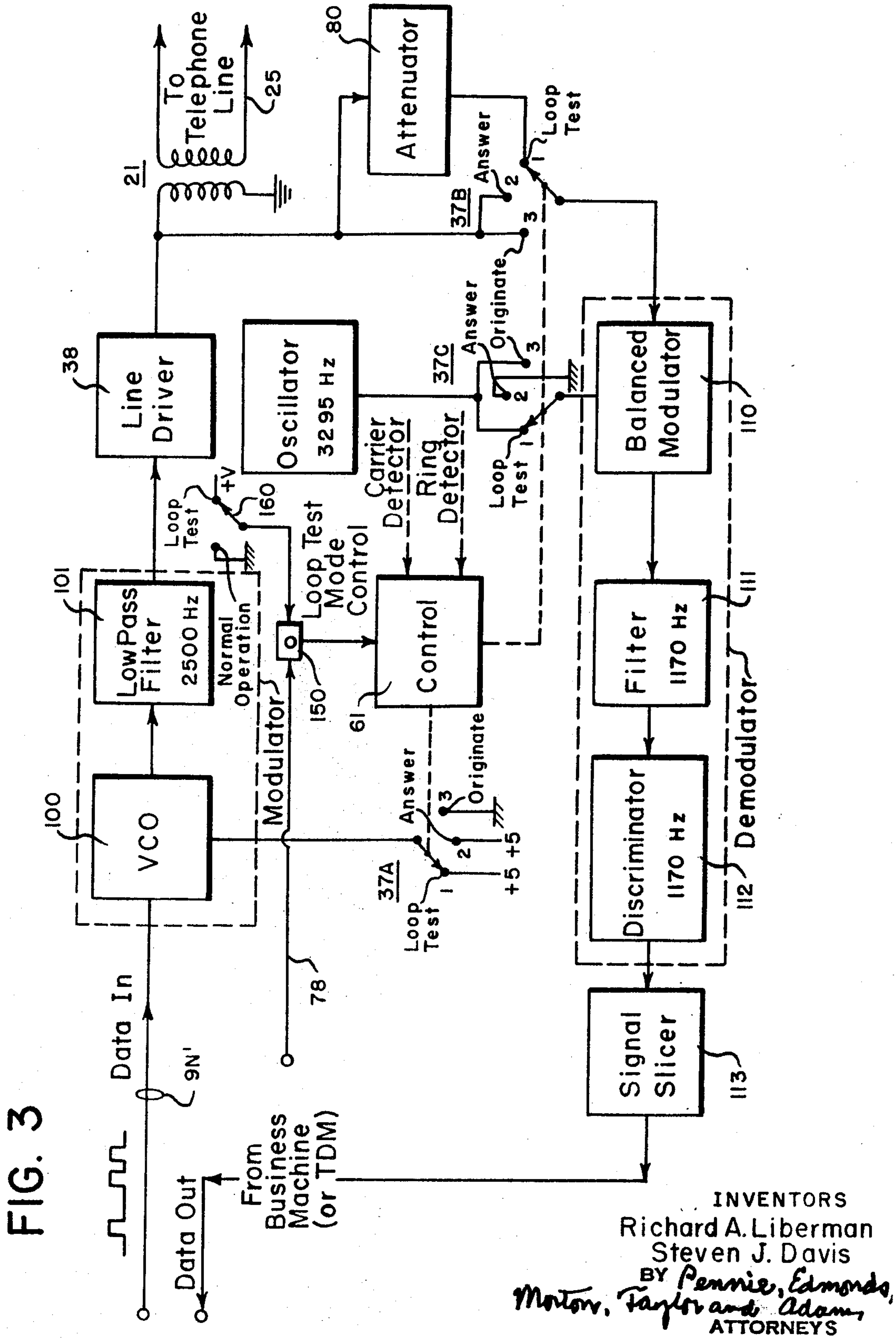
FIG. 3 is a simplified block diagram showing the closed loop test control means of the present invention as employed in conjunction with a preferred switched frequency modem.

In FIG. 3, there is shown a further preferred embodiment of the present invention as it is used with an improved and greatly simplified modem having a switchable oscillator and fixed frequency filter demodulator. In this embodiment voltage controlled oscillator 100 is changed in frequency from 2,125 Hz to 1,170 Hz by the setting of switch 37A to answer (position 2) or originate (position 3). The selected carrier frequency is shift modulated by input data and transmitted to line 25 via low pass filter 101 and line driver 38.

Signals received on line 25 are supplied to a balanced modulator 110 which passes an 1,170 Hz signal directly to discriminator 112 via filter 111. The demodulated data signal from 112 is reshaped by signal slicer 113 and supplied to output line 9N'.

When the received signal has a frequency of 2,125 Hz (call originate mode), a 3,295 Hz signal is supplied to balanced modulator 110 and the difference frequency sideband (i.e., 1170 Hz) is selected from the balanced modulator output and supplied to the discriminator 112 for demodulation. The modem shown in FIG. 3 has an advantage of requiring fewer oscillators and filters and accordingly is less expensive to manufacture.

The operation of control 61 in response to signals from a ring detector or carrier detector may be the same as the modem shown in FIG. 2 and described above. For purposes of simplification a description of these circuit operations will not be repeated.

For test loop analyses, the modem in FIG. 3 may be placed in loop test condition by applying either a remote test control signal to line 78 and OR gate 150 or a local test signal to 150 from switch 160. Switch 37–C is moved to loop test position 1 by control 61 acting in response to the output of OR gate 150. Oscillator 100 is thereby switched to the answer mode (2,125 Hz) and the transmitter output signal is coupled to the demodulator through attenuator 80, translated to the lower frequency of 1,170 Hz by balanced modulator 110 and supplied to the data output line 9N' for return to the transmission loop.

It will be apparent to those skilled in the art that various modifications may be made to the preferred embodiments described and illustrated herein without departing from the invention as defined in the claims.

We claim:

1. In a duplex data transmission modem having both a call originate mode of operation in which outgoing data is transmitted by modulation of a carrier frequency F1 and incoming data is received by demodulation of a data modulated carrier frequency F2 and an answer mode of operation in which data is received on frequency F1 and transmitted on frequency F2, a. a method of close loop testing the operation of said modem comprising b. operating the modem modulator in the answer mode;

c. operating the modem demodulator in the call originate mode; and d. connecting an attenuated level of the data modulated carrier output from the modulator to the input of the demodulator.

2. In a duplex data transmission modem having both a call originate mode of operation in which outgoing data is transmitted by modulation of a carrier frequency F1 and incoming data is received by demodulation of a data modulated carrier frequency F2 and an answer mode of operation in which data is received on frequency F1 and transmitted on frequency F2, means for close loop testing the operation of said modem from the digital side of said modem comprising:

a. first control switch means operable to energize the modem modulator for operation in the answer mode;

b. second control switch means operable to energize the modem demodulator for operation in the call originate mode; and c. means for connecting an attenuated level of the data-modulated carrier output from said modulator to the input of said demodulator.

* * * * *